United States Patent Office 3,291,061
Patented Dec. 13, 1966

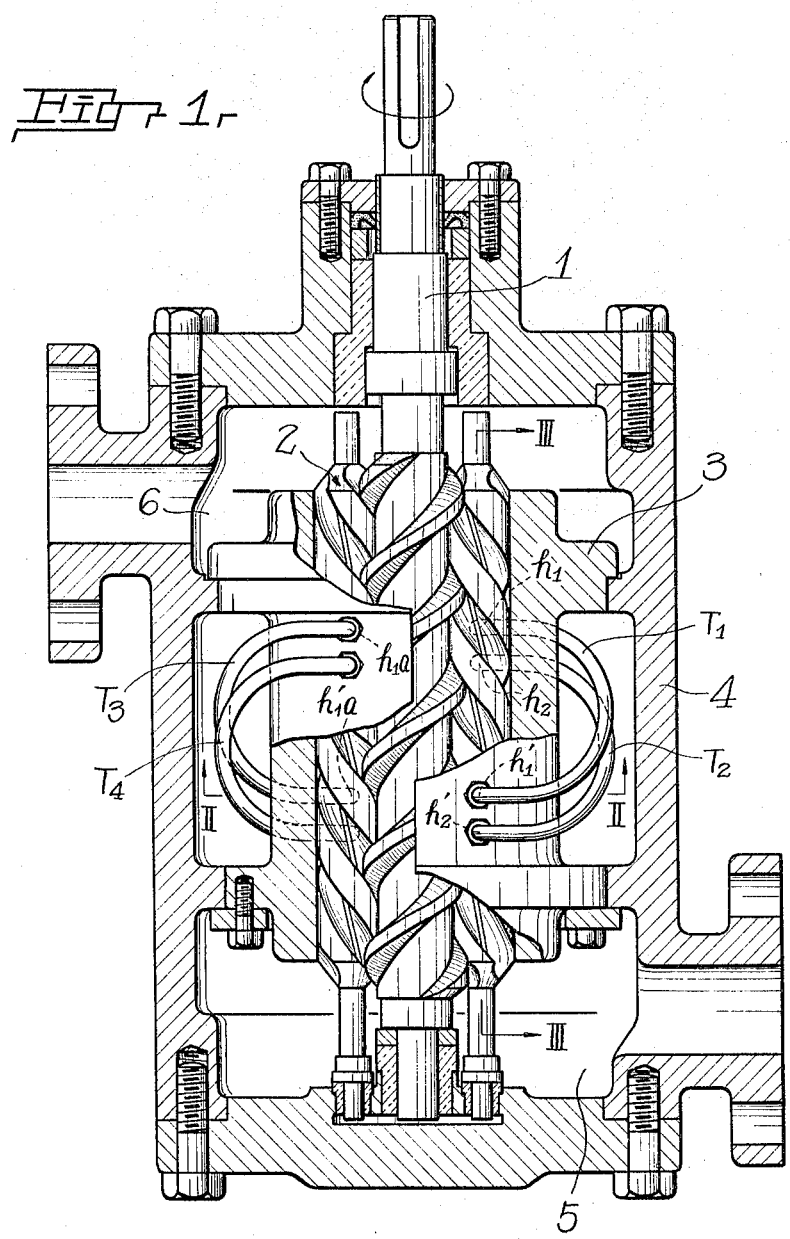

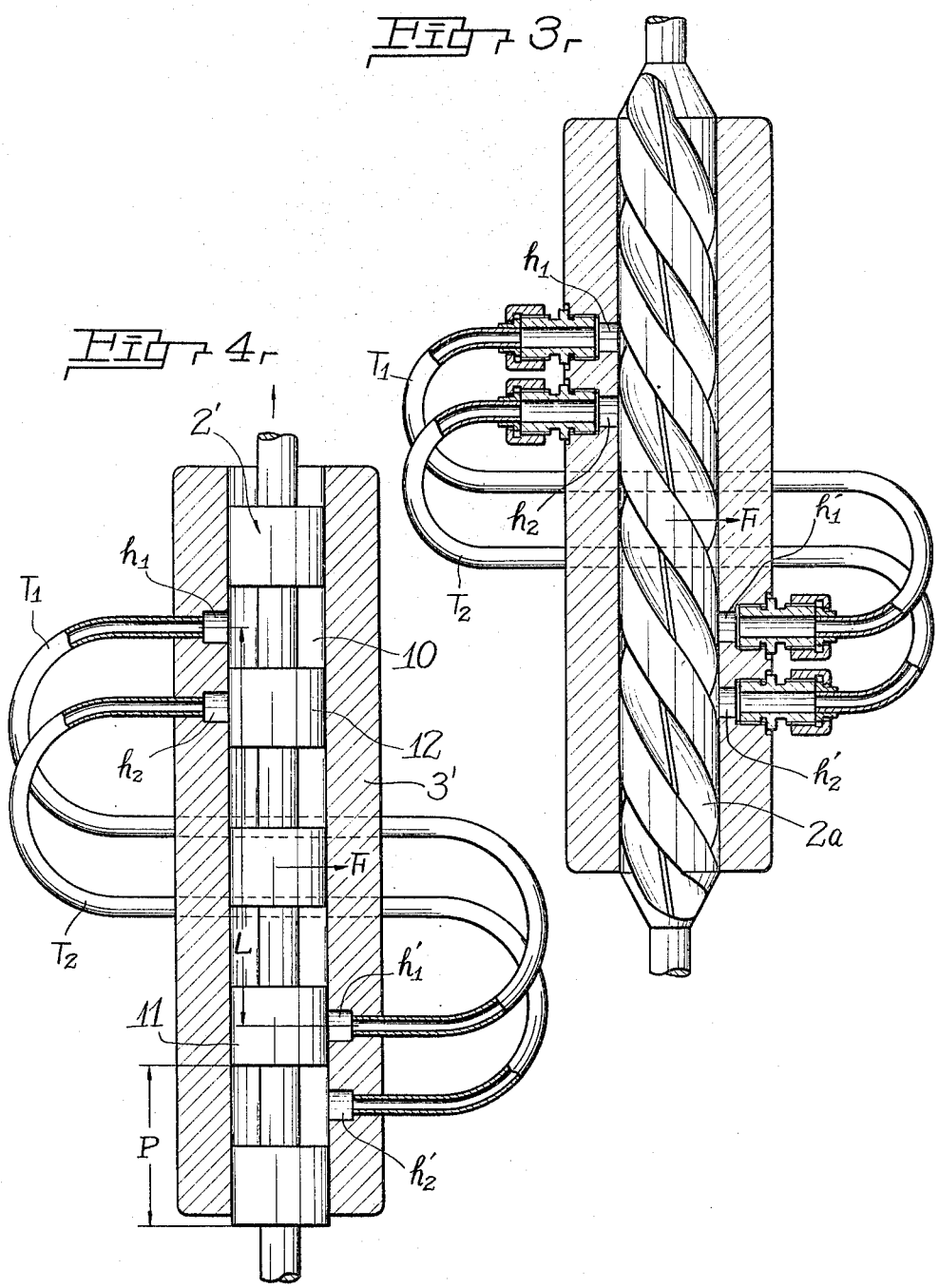

3,291,061
SCREW PUMP OR HYDRAULIC SCREW MOTOR
Kyuma Shinohara, Matsudo, Japan, assignor to Kosaka Kenkyusho Ltd., Tokyo, Japan, a corporation of Japan
Filed July 22, 1964, Ser. No. 384,344
Claims priority, application Japan, July 23, 1963, 38/39,336
6 Claims. (Cl. 103—128)

This invention relates to a screw pump or a hydraulic screw motor.

In a screw pump, when a liquid is displaced axially by the pumping action, a radial load and an axial load act on each of the screw shafts in the housing sleeve. Among these loads, the axial load will be easily supported by a suitable thrust bearing for the screw shafts, and further the radial load on the center screw shaft (driving screw shaft) will be balanced owing to the symmetrical arrangement of the side screw shafts (follower screw shafts) meshing with the center screw shaft. However, the radial loads on the side screw shafts, though they are small in comparison with the axial load, press the side screw shafts on the inner surface of the housing sleeve to increase friction loss and often cause burning, sticking or wearing of the screw shafts and the housing sleeve when the liquid to be pumped can not lubricate the inner surface of the housing sleeve satisfactorily. Accordingly, when the screw pump is one for high pressure use or one for pumping a liquid which is incapable of sufficient lubrication, materials of screw shafts and housing sleeve should be highly wear-resistant, their heat-treatment should be carried out carefully and, further, the length of screw shafts should be sufficiently large to decrease pressure intensity on the housing sleeve.

Therefore it is an important object of the present invention to provide a screw pump which has a high mechanical efficiency and a high durability at low cost.

Another object of the present invention is to provide a screw pump for high pressure use as one which may be constructed in a small size.

Since a screw pump may be used as a hydraulic screw motor the above objects may be described as the objects of the present invention in case of a hydraulic screw motor.

And, so as to accomplish the above objects, according to the present invention there is provided a screw pump or a hydraulic screw motor comprising a center screw shaft; at least two side screw shafts meshed with the center screw shaft; a housing sleeve for receiving the screw shafts; a casing provided with an inlet chamber and an outlet chamber; and radial load balancing means for the side screw shafts consisting of at least two pairs of interconnected holes bored in the wall of said housing sleeve, one hole of each pair opening to a higher pressure portion of the housing sleeve and the other hole of each pair opening to a lower pressure portion of the housing sleeve, the distance between the holes in each pair being substantially given by the equation $L=(n+\frac{1}{2})P$, where P is the pitch of screw shafts and $n$ is an integer.

The above screw pump or hydraulic screw motor will be apparent in the following description taken with the accompanied drawings in which:

FIG. 1 is a longitudinal section view of a screw pump according to the present invention;

FIG. 3 is a longitudinal section view taken substantially along the line III—III in FIG. 1; and FIG. 4 is a schematical drawing for explaining the function of balancing means.

Figure 2R:
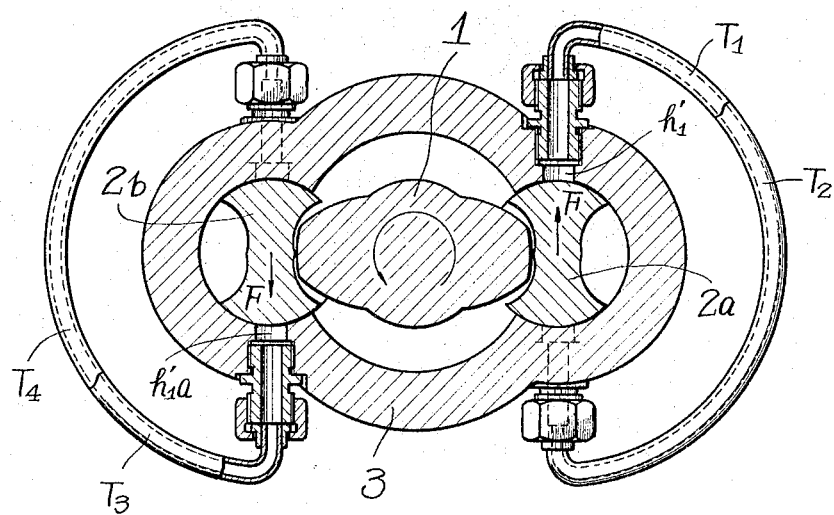
FIG. 2 is a cross section view taken substantially along the line II—II in FIG. 1.

Referring now to the drawings, the screw pump comprises a center screw shaft 1, a pair of said screw shafts 2a, 2b meshed with the center screw shaft, a housing sleeve 3 for receiving the screw shafts and a casing c surrounding said housing sleeve and provided with an inlet chamber 5 and an outlet chamber 6. The above construction is that of a common screw pump, and when the center screw shaft is driven in the direction shown by the arrow, liquid is pumped from the inlet chamber 5 to the outlet chamber 6.

The radial load of the center screw shaft 1 is balanced owing to the symmetrical arrangement of the side screw shafts 2a, 2b, but the radial loads working on the side screw shafts are not balanced without the balancing means hereinafter described. FIG. 2 shows the radial loads F working on the side screw shafts. And, to balance these radial loads F, the housing sleeve 3 is provided with four pipes $T_1$, $T_2$, $T_3$, and $T_4$, each of which connects a pair of holes in the wall of housing sleeve. Among these pipes, the pipes $T_1$ and $T_2$ are those for the balancing of the radial load on the side screw shaft 2a, and the pipes $T_3$ and $T_4$ are those for the balancing of the radial load on the side screw shaft 2b.

As seen in FIG. 3 the wall of the housing sleeve 3 is bored at four points and in a plane determined by the axis of the side screw shaft 2a and the radial load F on the side screw shaft 2a. The positions of the above four points, that is to say the locations of the holes $h_1$, $h_2$, $h'_1$, $h'_2$ are determined so that the two of them lie at higher pressure portions and the other two lie at lower pressure portions of the housing sleeve 3. Further, the two holes at the lower pressure side lie on the side opposite the two holes at the higher pressure side. The hole $h_1$ at the higher pressure side is connected to the hole $h'_1$ at the lower pressure side by the pipe $T_1$, and the hole $h_2$ at the high pressure side is connected to the hole $h'_2$ at the low pressure side by the pipe $T_2$. Roughly speaking, a state of displacement of liquid in a screw pump will be schematically represented by a cylinder 3′ through which a stepped piston 2′ moves in one direction at a constant speed. Accordingly, the functions of the above mentioned pipes and holes will be clarified by the following explanation referring to the schematical representation in FIG. 4.

In FIG. 4, the stepped piston 2′ and the cylinder 3′ correspond to the side screw shaft 2 and the housing sleeve 3 respectively. The piston 2′ moves upwards (as indicated by the arrow), and the pressure of liquid in the cylinder 2′ is assumed to increase from lower to higher steps. The location of the hole $h_1$ and that of the hole $h'_1$ are determined so that the hole $h_1$ is opened when the hole $h'_1$ is closed by the piston 2′, and vice versa. Therefore there is the following relation:

$$L=(n+\tfrac{1}{2})P$$

where

L: Distance between the hole $h_1$ and the hole $h'_1$
$n$: An integer
P: Pitch of step in the stepped piston 2′ or pitch of the screw shaft 2

When the hole $h_1$ is opened and the hole $h'_1$ is closed as shown in FIG. 4, the high pressure in the portion 10 will be transmitted through pipe $T_1$ and hole $h'_1$ to the portion 11 of the stepped piston to balance or reduce the radial load F. Further, when the piston 2' is advanced to close the hole $h_1$ by the portion 12 of the stepped piston, then, the low pressure in the hole $h'_1$ (in this state the hole $h'$ communicates with the low pressure portion of the cylinder) acts on the portion 12 at the hole $h_1$. Therefore, in this state, the load on the portion 12 is reduced at the area of port $h_1$. Accordingly, in this state, the radial load F is also reduced or balanced.

In order to balance the radial load on the side screw shaft $2b$, a hole $h_1a$ and a hole $h'_1a$ corresponding to the hole $h_1$ and the hole $h'_1$ respectively are also bored in the wall of the housing sleeve 3 at symmetrical locations with reference to the axis of center screw shaft 1. These holes are interconnected by the pipe $T_3$. Since the condition of the hole $h_1a$ is the same as that of the hole $h_1$, and the condition of the hole $h'_1a$ is the same with that of the hole $h'_1$, it is possible to connect the hole $h_1$ with the hole $h'_1a$ and the hole $h_1a$ with the hole $h'_1$ to shorten the length of piping.

It will be understood that the balancing or reduction of the radial loads may be possible by the holes $h_1$, $h'_1$, $h_1a$, $h'_1a$ and the pipe $T_1$, $T_3$.

However, the load balancing by the pipe $T_1$ or that of the pipe $T_3$ will be accompanied with a couple, because the working point of the balancing force will change from right to left and from left to right. And to remove or reduce the above couple, the pipe $T_2$ and the pipe $T_4$ are fitted to the housing sleeve 3. The functions of pipe $T_2$ and the holes $h_2$ and $h'_2$ interconnected by the pipe $T_2$ and the relative location between the holes $h_2$ and the $h'_2$ are the same as those of the pipe $T_1$ and the holes $h_1$ and $h'_1$, but the distance between the hole $h_1$ and the hole $h_2$ is selected to be equal to one half pitch of the screw shaft. Therefore, in this case, that is to say when the pipes $T_1$ and $T_2$ are both fitted, the balancing or the reduction of radial load is accomplished simultaneously at both high and low pressure sides to eliminate or reduce the above couple on the side screw shaft. The pipe $T_4$ corresponds to the pipe $T_2$ and cooperates with the pipe $T_3$ to balance the couple on the side screw shaft $2b$.

In the embodiment shown in the drawings, the housing sleeve is provided with pipes to interconnect the holes; however, it will be understood that these pipes may be substituted by suitable conduits which are formed by boring the housing sleeve itself. Further in regard to the above embodiment, the balancing or the reduction of radial load on each side screw shaft is accomplished by only one set of pipes and two pairs of holes, but it may be also understood that, if necessary, more sets of pipes and the holes interconnected by them may be used.

The merit of the present invention is especially remarkable, when a liquid which can not lubricate the surface of the housing sleeve satisfactorily is to be pumped. And, according to an experiment, it was recognized that a screw pump according to the present invention can reduce power necessary for its driving from twenty horse power to fifteen horse power when it is used for pumping kerosene.

What is claimed is:

1. A screw pump or a hydraulic screw motor comprising a center screw shaft; at least two side screw shafts meshed with the center screw shaft; a housing sleeve for receiving the screw shafts; a casing surrounding said housing sleeve and provided with an inlet chamber and an outlet chamber; and radial load balancing means for the side screw shafts consisting of at least two pairs of interconnected holes bored in the wall of said housing sleeve, one hole of each pair opening to a higher pressure portion of the housing sleeve and the other hole of each pair opening to a lower pressure portion of the housing sleeve, the distance L between the holes in each pair being substantially given by the equation $L=(n+\frac{1}{2})P$, where P is the pitch of screw shafts and $n$ is an integer.

2. A screw pump or a hydraulic screw motor comprising a center screw shaft; at least two side screw shafts meshed with the center screw shaft; a housing sleeve for receiving the screw shafts; a casing surrounding said housing sleeve and provided with an inlet chamber and an outlet chamber; and radial load balancing means consisting of at least two pairs of holes bored in the wall of said housing sleeve and pipes interconnecting respectively said each pair of holes, one hole of each pair opening to a higher pressure portion of the housing sleeve and the other hole of each pair opening to a lower pressure portion of the housing sleeve, the distance L between the holes in each pair being substantially given by the equation $L=(n+\frac{1}{2})P$, where P is the pitch of screw shafts and $n$ is an integer.

3. A screw pump or a hydraulic screw motor comprising a center screw shaft; at least two side screw shafts meshed with the center screw shaft; a housing sleeve for receiving the screw shafts; a casing surrounding said housing sleeve and provided with an inlet chamber and an outlet chamber; and radial load balancing means consisting of at least two pair of holes bored in the wall of said housing sleeve and conduits bored in the housing sleeve itself and interconnecting respectively said each pair of holes, one hole of each pair opening to a higher pressure portion of the housing sleeve and the other hole of each pair opening to a lower pressure portion of the housing sleeve, the distance L between the holes in each pair being substantially given by the equation $L=(n+\frac{1}{2})P$, where P is the pitch of the screw shafts and $n$ is an integer.

4. A screw pump or a hydraulic screw motor comprising a center screw shaft; at least two side screw shafts meshed with the center screw shaft; a housing sleeve for receiving the screw shafts; a casing surrounding said housing sleeve and provided with an inlet chamber and an outlet chamber; first radial load balancing means for the side screw shafts consisting of at least two pairs of interconnected holes bored in the wall of said housing sleeve, one hole of each pair opening to a higher pressure portion of the housing sleeve and the other hole of each pair opening to a lower pressure portion of the housing sleeve, the distance L between the holes in each pair being substantially given by the equation $L=(n+\frac{1}{2})P$, where P is the pitch of screw shafts and $n$ is an integer; and a second radial load balancing means having the same elements as those of the first radial load balancing means, the distance between the corresponding holes of the first and second radial load balancing means being substantially equal to one half pitch of the screw shafts.

5. A screw pump or a hydraulic screw motor comprising a center screw shaft; at least two side screw shafts meshed with the center screw shaft; a housing sleeve for receiving the screw shafts; a casing surrounding said housing sleeve and provided with an inlet chamber and an outlet chamber; first radial load balancing means consisting of at least two pairs of holes bored in the walls of said housing sleeve and pipes interconnecting respectively said each pair of holes, one hole of each pair opening to a high pressure portion of the housing sleeve and the other hole of each pair opening to a lower pressure portion of the housing sleeve, the distance L between the holes in each pair being substantially given by the equation $L=(n+\frac{1}{2})P$, where P is the pitch of the screw shafts and $n$ is an integer; and a second radial load balancing means having the same elements as those of the first radial load balancing means, the distance between the corresponding holes of the first and second radial load balancing means being substantially equal to one half pitch of the screw shafts.

6. A screw pump or a hydraulic screw motor comprising a center screw shaft; at least two side screw shafts meshed with the center screw shafts; a housing sleeve for receiving the screw shaft; a housing sleeve for receiving the screw shafts; a casing surrounding said housing sleeves and provided with an inlet chamber and an outlet chamber; a first radial load balancing means consisting of at least two pair of holes in the wall of said housing sleeve and conduits bored in the housing sleeve itself and interconnecting respectively said each pair of holes, one hole of each pair opening to a higher pressure portion of the housing sleeve and the other hole of each pair opening to a lower pressure portion of the housing sleeve, the distance L between the holes in each pair being substantially given by the equation $L=(n+\frac{1}{2})P$, where P is the pitch of the screw shafts and $n$ is an integer; and a second radial load balancing means having the same elements with the first radial load balancing means the distance between the corresponding holes of the first and second radial load balancing means being substantially equal to one half pitch of the screw shafts.

References Cited by the Examiner
UNITED STATES PATENTS

| | | | |
|---|---|---|---|
| 1,620,261 | 3/1927 | Kennedy | 103—126 |
| 2,176,787 | 10/1939 | Burghauser | 103—128 |
| 2,188,702 | 1/1940 | Burghauser | 103—128 |
| 3,130,894 | 9/1963 | Sennet | 103—128 |

MARK NEWMAN, *Primary Examiner.*

SAMUEL LEVINE, *Examiner.*

W. L. FREEH, *Assistant Examiner.*